United States Patent

Boisvert, Jr.

[15] 3,644,899

[45] Feb. 22, 1972

[54] METHOD FOR DETERMINING PARTIAL MEMORY CHIP CATEGORIES

[72] Inventor: Conrad J. Boisvert, Jr., Wappingers Falls, N.Y.

[73] Assignee: Cogar Corporation, Wappingers Falls, N.Y.

[22] Filed: July 29, 1970

[21] Appl. No.: 59,109

[52] U.S. Cl. .......... 340/172.5

[51] Int. Cl. .......... G06f 11/04

[58] Field of Search .......... 340/172.5; 235/153; 324/73

[56] References Cited

UNITED STATES PATENTS 3,331,058 7/1967 Perkins, Jr. .......... 340/172.5

3,422,402 1/1969 Sakalay .......... 340/172.5

3,444,526 5/1969 Fletcher .......... 340/172.5

*Primary Examiner*—Raulfe B. Zache

*Attorney*—Harry M. Weiss

[57] ABSTRACT

A machine-practiced method for determining partial memory chip categories. In the case of 128-cell chips having seven address bits, there are fourteen partial memory chip categories; permanently addressing any one of the seven address lines with a 1 or a 0 produces an effective 64-cell chip, any cell of which can be selected depending upon the address bits extended to the other six address lines. Each address bit of each bad cell on the chip is examined. Depending on its value, one of two respective partial chip categories is eliminated. After all cells have been processed in this manner, the partial chip categories which have not been eliminated are those applicable to the chip.

19 Claims, 6 Drawing Figures

Figure 1:
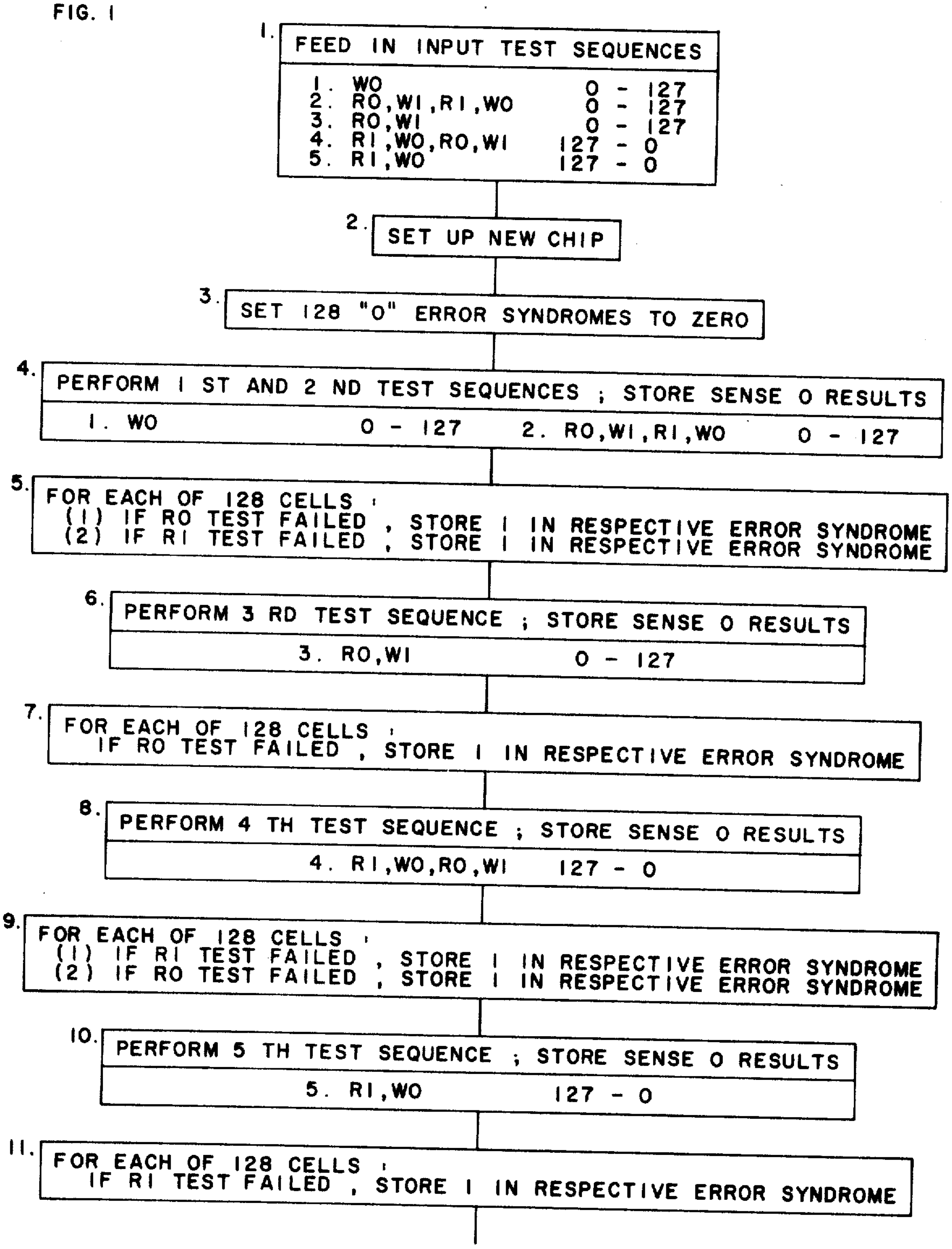

INVENTOR
CONRAD J. BOISVERT, JR.
Amster & Rothstein
BY Harry M Weiss
ATTORNEYS

METHOD FOR DETERMINING PARTIAL MEMORY CHIP CATEGORIES

This invention relates to partial memory chips, and more particularly to a method for determining partial memory chip categories.

A typical semiconductor integrated circuit memory chip contains a plurality of memory cells and a sufficient number of address lines to enable the selection of a particular cell. For example, in the case of a chip having 128 cells, seven address bits are required to identify any given cell. In a typical memory array, the same address bits are extended to each chip; the same numbered cell is identified in each chip. In order to select particular cells in the overall array (to operate upon only those cells in a predetermined word), each chip is provided with a chip select conductor. The only cells which are operated upon are those which are identified by the common address bits and which are contained on chips whose chip select conductors are energized.

It is often found that not all cells in a particular chip are functional. There are a variety of systems commercially available for performing individual tests on each cell of a chip being tested. With the use of such automated equipments it is possible to determine which cells are not functional. Standard test equipments can generally be programmed so that different test sequences are performed on different types of chips, thus not requiring a separate test system for every type of chip produced.

Despite great advances in semiconductor technology, it is often found that one or more cells on a memory chip are not functional. Rather than to throw away such a chip, it has been suggested to use only some of the operative cells on the chip. For example, consider the case in which a single cell on a 128-cell chip is inoperative. The chip can be used in a memory array provided that the address conductors never identify the inoperative cell. This can be accomplished by using only six of the seven address conductors and utilizing the chip in an array in which each chip has only 64 functional cells. Each address bit of the seven address bits serves to divide the chip into two parts, each containing 64 cells. Any one of the seven address conductors can be wired permanently to a fixed potential (low or high, that is, a 0 or 1) so that the address bits on the other six address conductors identify one of the 64 cells in the group containing 64 operative cells. In effect, by wiring one of the address conductors to a fixed potential, the chip is converted to a chip of half the capacity.

It is apparent that if a single cell in a 128-cell chip is inoperative, the chip can be used as a partial chip in any one of seven different ways. For example, suppose that the address of the inoperative cell is 1001001, where a 1 represents a high potential on the respective address conductor and a 0 represents a low potential on the respective address conductor. To preclude addressing of the inoperative cell, all that is required is to insure that at least one of the seven address conductors cannot be addressed with the respective bit in the address of the cell. For example, if any one of the first, fourth and seventh address conductors is wired to a low potential, the inoperative cell cannot possibly be operated upon because the seven address bits cannot all be of the necessary values to identify the cell. Similarly, if at least one of the second, third, fifth and sixth address conductors is permanently wired to a high potential, the inoperative cell can never be addressed. Whichever address conductor is permanently wired to the potential which will preclude addressing of the inoperative cell, the six address bits supplied to the other six address conductors enable 64 good cells to be addressed.

It is apparent that in the case of 128-cell chips, there are 14 "partial" categories. Each category is associated with a respective one of the seven address conductors being permanently wired to a high or low potential. (It is possible to permanently wire two or more of the address conductors to fixed potentials in which case the 128-cell chip is converted to a chip having only 32, 16 or fewer operative cells, but in the illustrative embodiment of the invention the permanent addressing of only one of the address conductors is considered.) In the usual fabrication of a memory system, the chips are contained in modules (more than one chip can be included in the same module) and the modules are attached by pin connections to a circuit board. Typically, a printed circuit board used in conjunction with 128-cell chips for deriving a memory in which only 64 cells on each chip are utilized would have a wiring pattern such that chips of the same partial category would be used on the board. For example, the board might be designed such that address conductor 4 would be connected to a low potential while only the other six address conductors would be addressed high or low. In such a case, the partial chips which would have to be used on the board would be those in which 64 good cells can be addressed when the fourth address conductor is held at a low potential. The technique of using partial chips in this manner is disclosed in application, Ser. No. 45,116, filed on June 10, 1970 in the names of Allen et al.

For maximum flexibility in production it would be highly desirable to identify all partial categories of each chip. In the case of a 128-cell chip having only a single inoperative cell, the chip can be used in any one of seven different types of arrays, that is, it can be used on seven of the 14 possible circuit boards—namely, the seven boards which permanently address one of the seven address conductors with a bit different from the bit necessary to address the inoperative cell. It is possible for a chip having only two inoperative cells to be incapable of use as a partial chip. For example, if cells 1001001 and 0110110 (with complementary addresses) are both inoperative, it is apparent that no matter which of the seven address conductors is tied to a high or low potential, the cycling of the other six address conductors will result in the addressing of one of the two inoperative cells. Depending on the number of cells which are inoperative on any 128-cell chip, and their addresses, it is possible for the chip to be identified in anywhere from no partial chip categories to seven partial chip categories of the total of 14 categories. If the chip is identified by three such categories, for example, it can be used with any one of three different types of 64-cell chip arrays. (In some cases, chips of different categories can be used on the same circuit board but this requires additional wiring of pins to high or low potentials; but even in this case it is necessary to know the partial categories of each chip used in the array and it is therefore highly desirable to know the partial categories of all the chips so that they can be used in any category in which there is a need for more chips.)

The straightforward approach to the determination of partial chip categories is for the automatic tester to apply a fixed potential to one of the seven address conductors and to then cycle the other six address conductors through a total of 64 states. Each of the addressed cells is tested, and if it is determined that they are all good the chip can be identified in the category in which the selected address conductor is permanently wired to the fixed potential. It is apparent that this approach requires 14 different test sequences, each sequence including the complete testing of 64 cells. Fourteen sequences are required because each of the seven address conductors must be connected to both a high and a low potential while the other six address conductors are cycled. This is an exceedingly time-consuming process.

It is a general object of my invention to provide a method for very rapidly determining partial memory chip categories.

In accordance with the principles of my invention, all of the cells on the chip can be tested in a conventional manner without applying a fixed potential to one of the address conductors while all of the others are cycled in order to test for partial chip categories. The testing of the cells is performed without partial chip category considerations. During the testing, the inoperative cells are identified (as all seven address bits are cycled in the case of 128-cell chips). No further tests are performed to determine the partial chip categories. Instead, they are determined solely by a computer (generally a part of the tester in the first place) from the addresses of the inoperative cells. The data processing is very fast since it does not involve actual testing of cells. In fact, following the testing of a chip, while the tester is causing the next chip to be moved underneath the test probes, the computer determines the partial chip categories and controls their printout. In a typical case, the algorithm for determining the partial memory chip categories is finished by the time the next chip is in place; thus, conventional test sequences can be utilized and yet a list of partial memory chip categories for each chip can be provided with no additional time required for the processing of each chip.

The algorithm of my invention can be understood by first associating the partial categories with the seven address lines (in the case of 128-cell chips). The address lines are numbered 0 through 6 and have respective binary weights 1, 2, 4, 8, 16, 32 and 64. A chip is of partial category (or type) 1 if when address line 6 is held at a high potential (1) and the other six address lines are cycled, 64 good cells are addressed. Similarly, the chip is of partial type 2 if when address line 6 is held at a low potential (0) and the other six address lines are cycled, 64 good cells are identified.

A chip is of partial type 3 if when address line 5 is held at a high potential (1) the other six address lines can be cycled to address 64 good cells. Similarly, if address line 5 is permanently connected to a low potential (0) and the other six address lines can be cycled to address 64 good cells, the chip is of partial type 4. The following table associates each partial category with its respective address line and a particular permanent value for that line:

| address line | 0 | 1 | 2 | 3 | 4 | 5 | 6 | |
|---|---|---|---|---|---|---|---|---|
| binary weight | 1 | 2 | 4 | 8 | 16 | 32 | 64 | |
| partial type | 13 | 11 | 9 | 7 | 5 | 3 | 1 | address bit value 1 |
| | 14 | 12 | 10 | 8 | 6 | 4 | 2 | address bit value 0 |

Consider a particular inoperative cell having an address 1001001. A chip of partial type 1 is a chip in which if address line 6 is held at a high potential the other six address lines can be cycled to identify 64 good cells. The converse of this statement is that if any cell is no good and its address includes a 1 in address bit position 6, then the entire chip cannot be utilized as a partial type 1. Since the most significant address bit for the cell under consideration is a 1 and the cell is no good, partial category 1 is eliminated.

Similarly, because the fifth address bit is a 0, the chip cannot be utilized in partial category 4. Referring to the chart above, if a chip is of partial type 4 it means that the fifth address conductor can be tied to a low potential (0) while the other six address conductors are cycled to address 64 good cells. In the case of the chip under consideration, if address line 5 is tied to a low potential, as the other six lines are cycled eventually the address will be 1001001 and an inoperative cell will be identified. For this reason, the chip under consideration with an inoperative cell having an address 1001001 cannot be contained in partial category 4. A further analysis of this type in conjunction with the chart above immediately reveals that the chip under consideration cannot be contained in categories 1, 4, 6, 7, 10, 12 and 13.

The first time an inoperative cell is detected, seven of the 14 partial categories are eliminated. If the cell with the complementary address is also inoperative, the chip cannot be utilized in any partial chip configuration even though there may be only two inoperative cells. In the example above, if the address of the second inoperative cell is 0110110, partial categories 2, 3, 5, 8, 9, 11 and 14 are eliminated. In such a case, there are no partial categories left.

On the other hand, suppose that the second inoperative cell has an address 1001011. With reference to the chart above, the partial categories which are eliminated by this inoperative cell are categories 1, 3, 6, 7, 10, 12 and 13. The first inoperative cell eliminated six (1, 6, 7, 10, 12 and 13) of these seven partial categories. Thus the two cells together eliminate eight of the 14 possible categories. If no other cells are inoperative, the chip can be classified in categories 2, 5, 8, 9, 11 and 14.

It is thus apparent that all that is required to determine all of the partial chip categories for a particular chip are the addresses of the inoperative cells. The algorithm of my invention is predicated on the following observation: a chip of partial type 7, for example, is a chip in which, if address line 3 is held at a high potential, the cycling of the other six address lines will identify 64 good cells. Conversely, if any cell is no good and bit 3 in its address is a 1, the entire chip cannot function as a partial type 7 chip. Similar remarks apply to each of the other 13 partial categories. Thus, simply by operating on the addresses of the inoperative cells (in a sequence to be described below), it is possible to identify all partial chip categories without performing any tests on the chip other than the conventional tests used to identify good and bad cells.

The method of my invention can be practiced on an automatic tester which is suitable for testing memory chips. A particular tester which can be used is the PAFT II (programmable automatic function tester) manufactured by the Redcor Corporation of Canoga Park, California, used in conjunction with Electroglas test probes. The PAFT II tester performs both functional and parametric tests on MOS/LSI devices by generating (under computer control) program-selectable clocks, strobes, input/output patterns, and voltage levels that automatically execute pass/fail tests on a given device under test. Test programs can be generated by any one of the program language processors included in the Redcor standard software package. The PAFT II system includes an RC 70 general purpose digital computer, and the system is thus ideally suited for the practice of my invention in which the algorithm for determining partial categories is performed while the chip previously tested is being removed and a new chip is being moved under the test probes.

Figure 2:
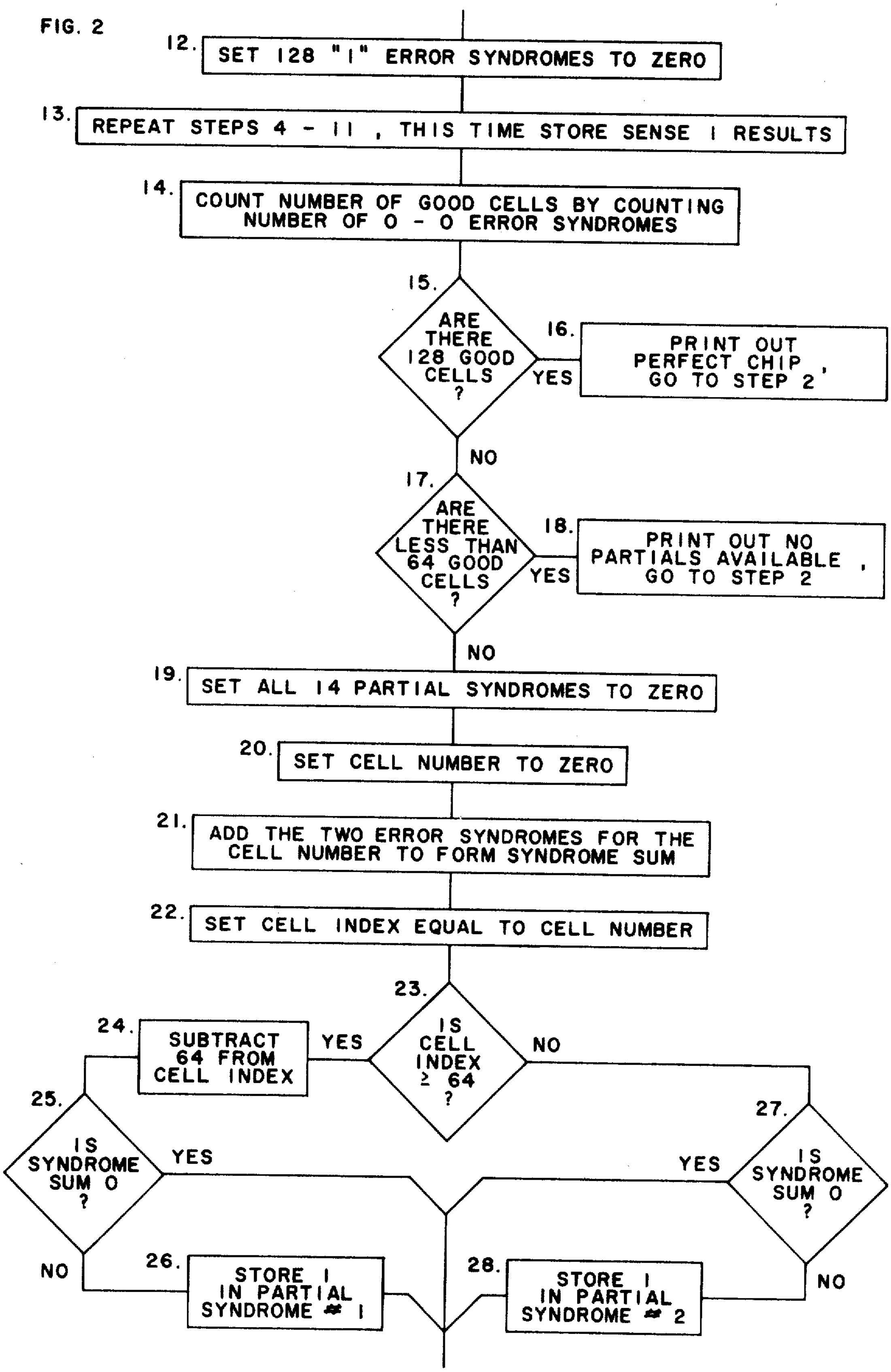
Figure 3:
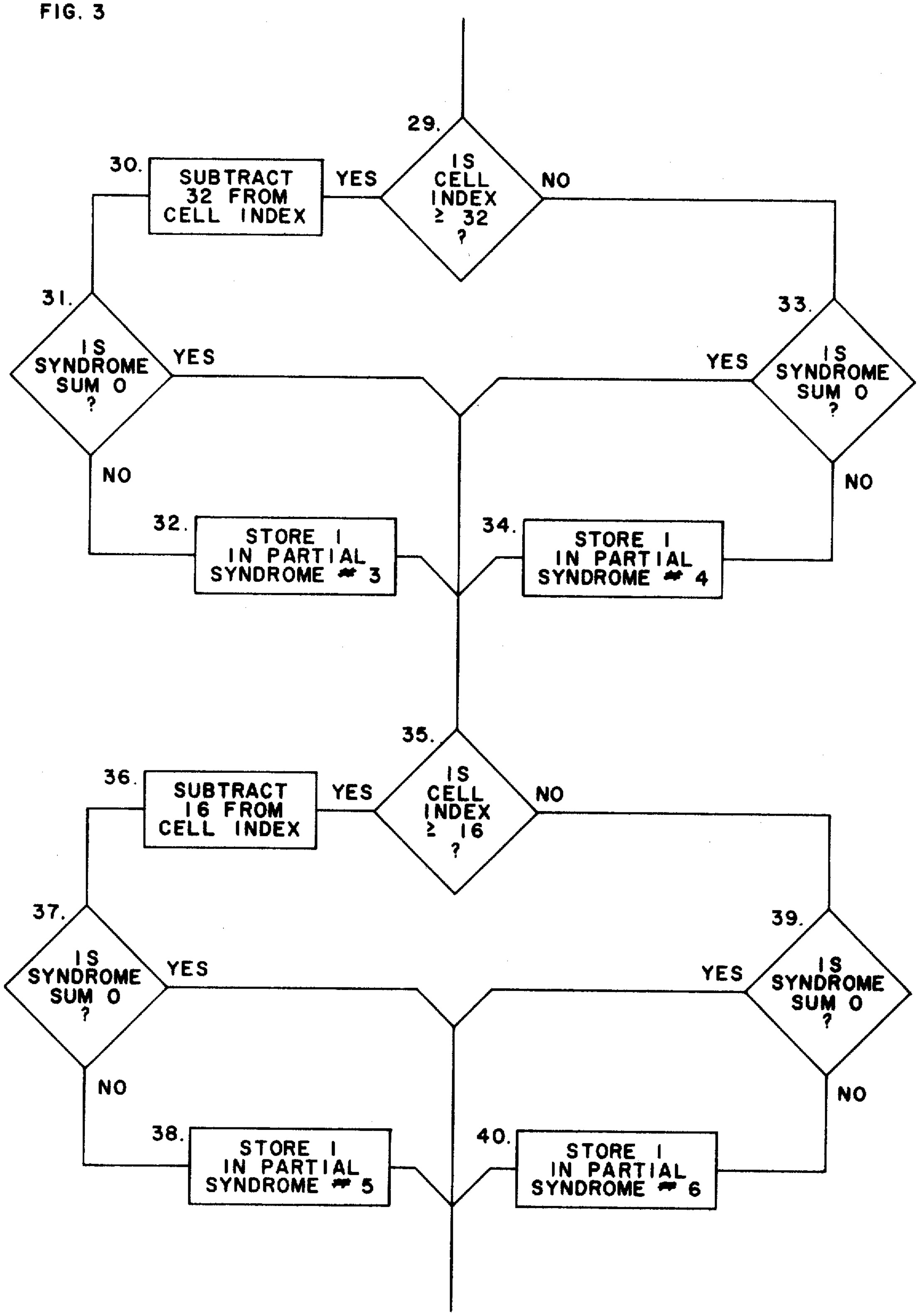
Figure 4:
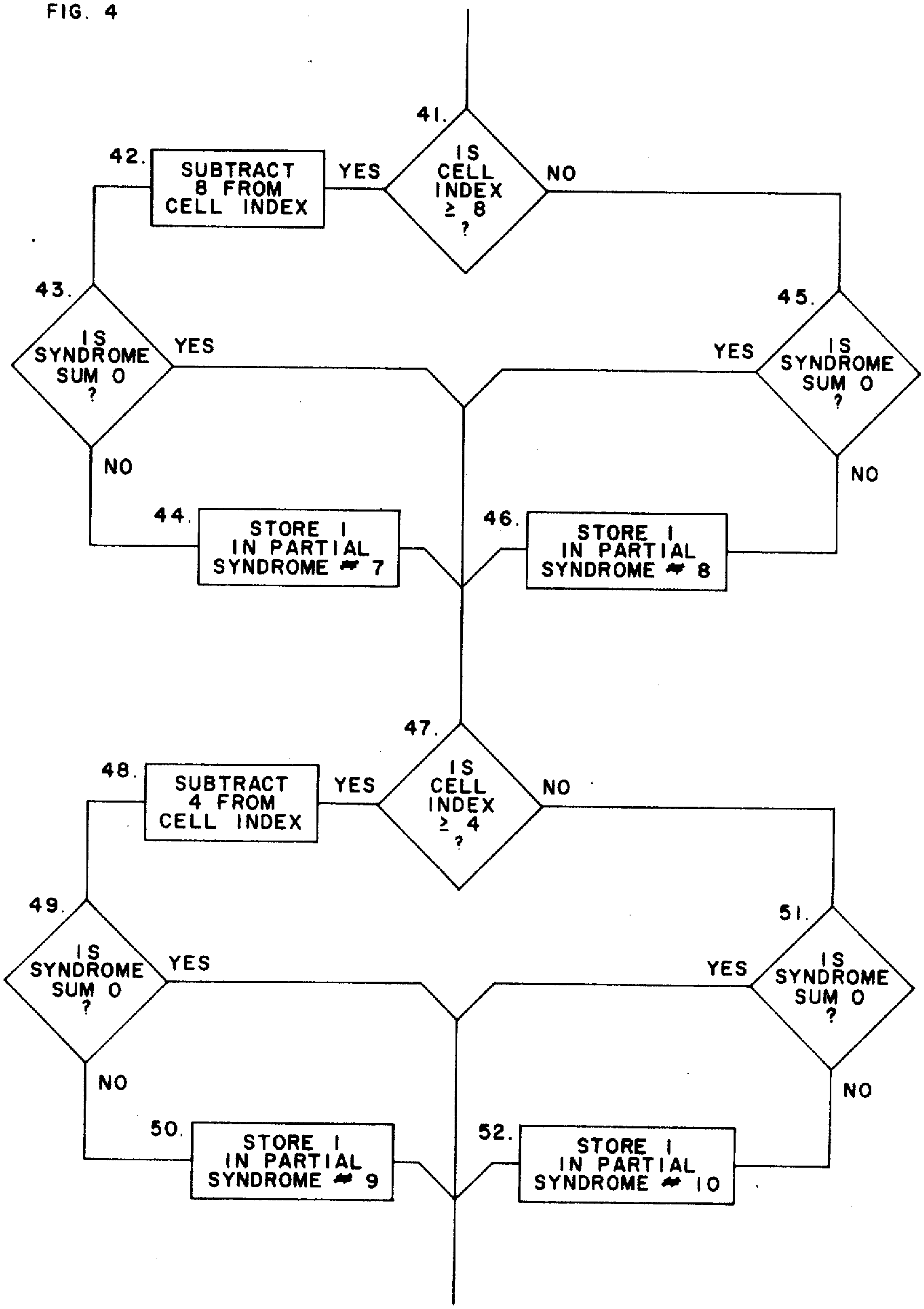
Figure 5:
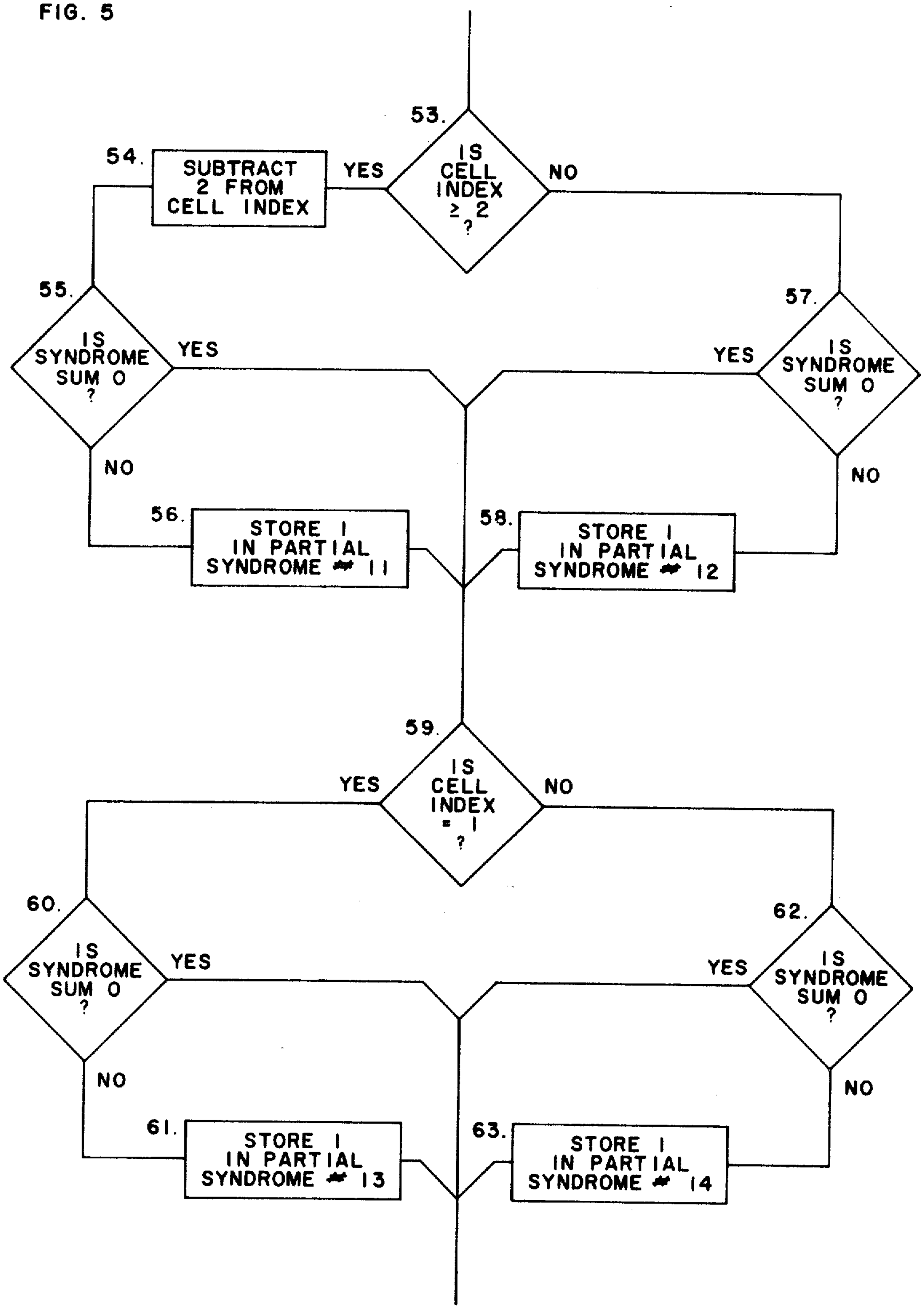
Figure 6:
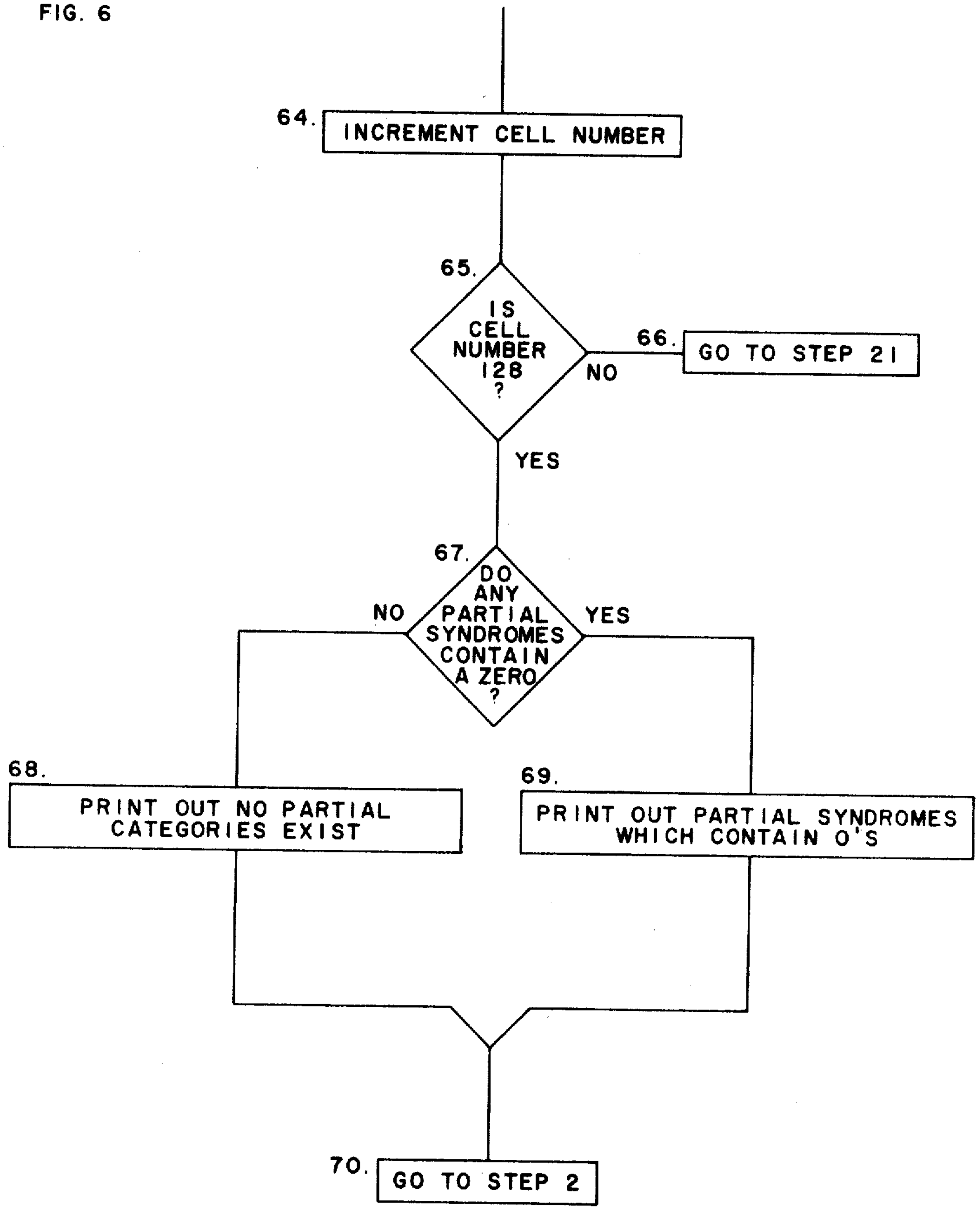

Further objects, features and advantages of my invention will become apparent upon consideration of the following detailed description in conjunction with the drawing, in which:

FIGS. 1–6, with the figures being placed one on top of the other, depict a flow chart illustrating the steps performed in the illustrative embodiment of my invention. The actual programming of the Redcor RC 70 general purpose digital computer in accordance with the flow chart of the drawing, or the programming of any other chip tester or computer, will be apparent to those skilled in the art.

In the first step of the program, the input test sequences are fed into the computer. The test sequences are of types which have been used in the prior art. The first "test" (W0) consists of the writing of a 0 in each of the 128 cells. The cells are addressed successively in ascending order (0–127). During this first sequence, no bits are read from the cells.

In the second sequence, each cell is operated on as follows: the cell is first read to verify that a 0 was written in it during the first sequence (R0). Then a 1 is written into the cell (W1); the cell is then read to see that the 1 was indeed written in it (R1). At the end of the sequence a 0 is written into the cell (W0). These operations are symbolized by the notation R0, W1, R1, W0. All four operations are performed on each cell before the system advances to test the next cell. The cells are addressed in ascending order. During the third test, the 0 written in each cell at the end of the second sequence is read from the cell (R0), following which a 1 is written into the cell (W1). Again, the cells are operated upon in sequence, in ascending order.

During the fourth test, the 1 previously written in each cell is read (R1), a 0 is written (W0), the cell is then read to verify that a 0 was correctly written (R0), and finally a 1 is written in the cell (W1). During the fourth test sequence, the cells are operated upon in sequence, in descending order (127–0).

Finally, during the fifth test sequence, the 1 previously written in each cell is read (R1), following which a 0 is written into the cell (W0). Once again, the cells are operated upon in descending order.

This type of test sequence not only tests that 0's and 1's are properly written into and read out of cells, it also performs the tests such that if the cells interact with each other to produce erroneous results, the interactions are detected. At the end of the second test sequence, for example, each cell has a 0 written into it (W0). If the writing of a 1 in any cell during the third sequence causes a 1 to be erroneously written in a higher number cell, then when this higher number cell is operated upon during the third test sequence the bit read out of the cell will be a 1 instead of the 0 which it should be. This is an indication of a multiple addressing problem—the addressing of a lower number cell identifies that cell and a higher number cell together. The writing of a 1 at the end of the fourth test sequence on each cell similarly enables the system to determine whether there is a multiple addressing problem in the opposite direction. At the end of the fifth sequence on each cell, a 0 is written in it. If the 0 is erroneously written into a lower number cell as well, then when the state of that cell is sensed at the start of the fifth test sequence on the cell, a 0 will be detected rather than the 1 written at the end of the fourth test sequence on the cell.

The particular test sequences performed is not an aspect of the present invention. Conventional test sequences can be employed. The object of the tests is simply to determine which, if any, of the 128 cells are no good.

After the test sequences are fed into the machine (but before they are performed on the cells) a new chip is set up under the test probes. This is shown as step 2 in the flow chart.

An area of the computer memory is then set aside to represent "0" error syndromes. There are 128 "0" error syndrome bits and all of them are initially set in the 0 state. Each chip is often provided with a pair of sense lines. In a typical configuration, when a 0 is sensed in a selected cell the 0 sense line should go high and the 1 sense line should go low. Similarly, when a selected cell contains a 1, the 0 line should go low while the 1 line should go high. During the first half of the testing, only the 0 sense line is examined. When the bit read out of a cell should be a 0, if the 0 sense line goes high the test is passed; if the 0 sense line does not go high the "0" error syndrome memory location for that cell has a 1 written in it to indicate that the cell did not operate properly. Similarly, the "0" error syndrome is set in the 1 state if the 0 sense line goes high when a 1 should be read from the cell. (The problem may be with the decoding circuits, sense circuits, etc., rather than the cell, but in any event it is an indication that the cell cannot be used.) After all five test sequences are performed on each of the 128 cells, 128 "1" error syndrome memory locations are set in the 0 state, as will be described below. During the second performance of all five test sequences, the 1 sense line is examined. Again, if the 1 sense line does not have the proper potential on it when a cell is read, the error syndrome memory location for the cell is set in the 1 state.

Prior to the examination of the 0 sense line during the first performance of the five test sequences on each cell, all 128 "0" error syndromes are set to 0. In the fourth step of the program, the first and second test sequences are performed on all of the cells. The computer stores the sense 0 results, that is, it temporarily stores information indicative of whether or not the sense 0 line was of the proper polarity during each of the two read operations performed on each cell. In step 5 of the program, a 1 is stored in the respective error syndrome for any cell which failed either the R0 or R1 test. In step 6, the third test sequence is performed and the sense 0 results are temporarily stored. In step 7, the error syndrome for each cell is set in the 1 state if the 0 sense line did not go low when the state of the cell was last sensed.

In step 8, the fourth test sequence is performed and the sense 0 results are temporarily stored; in step 9, the error syndrome for any cell is set in the 1 state if the 0 sense line was of the wrong polarity either time the cell was read during step 8.

Finally, in the 10th and 11th steps, the fifth test sequence is performed and if the R1 test fails on any cell, the error syndrome for that cell is set in the 1 state.

After all of the cells have been tested in this manner by examining the 0 sense line, in step 12 the 128 "1" error syndromes are set to 0. In step 13, steps 4–11 are repeated; but this time the 1 sense line is examined each time a read operation is performed. Any time the polarity on the 1 sense line is improper, the "1" error syndrome for the cell being sensed is set in the 1 state.

At the end of step 13, it is apparent that if either of the error syndromes for any cell is in the 1 state, the cell is no good (that is, it cannot be used). In step 14, the number of 0–0 error syndrome pairs is counted to determine the number of good cells. In step 15, a test is performed to determine whether all of the cells are good. If they are, that is, if there are 128 0–0 error syndrome pairs, as indicated in step 16 the printout is controlled to indicate that the chip is perfect and the program proceeds to step 2—a new chip is set up and then tested.

On the other hand, if there are not 128 good cells, a simple test is performed to determine whether there are no partial categories at all. If there are less than 64 good cells, the chip cannot be used as a partial of any type. Thus, if the result of the test in step 17 is affirmative, the printout in step 18 indicates that the chip cannot be used and the tester proceeds to step 2 to begin the testing of another chip. On the other hand, if there are 64 or more good cells (64 or more 0–0 error syndrome pairs), the computer begins to analyze which partial categories are descriptive of the chip under test.

Fourteen memory locations in the computer are allocated to respective partial categories. These 14 memory locations are referred to below as "partial syndromes." In step 19, all of the partial syndromes are set to 0. By the end of the data processing to be described below, any partial syndrome which is still in the 0 state represents a partial category descriptive of the chip under test. On the other hand, any partial syndrome in the 1 state indicates that the chip cannot be used in the respective partial category.

It is necessary for the system to "remember" which cell number is being processed. In step 20, a memory location in the computer referred to as "cell number" is set to 0; the first cell to be operated upon is the cell whose address is 0. At the end of the test sequence on each cell, as will become apparent below, the cell number is incremented so that the next succeeding cell can be analyzed.

In step 21, the two error syndromes for each cell are added together to form a syndrome sum for the cell. These syndrome sums are stored in the memory. If the syndrome sum for any cell is 0, it is an indication that the cell is good. If the syndrome sum is a 1 or a 2 (it is a 2 in the event both the "0" error syndrome and the "1" error syndrome for the cell are both 1's), it is an indication that the cell is no good.

In step 22, a "cell index" is set equal to the "cell number." As will become apparent below, as each cell is analyzed the cell index is decreased in value. Were the cell number to be operated upon directly, the system would not have a record of which cell is being operated upon and could not advance to the next cell. It is for this reason that the cell number, after it is initially incremented as will be described below, is not changed as it is determined which partial categories are eliminated by the cell if it is no good. The cell index is modified during the processing but the cell number which is not changed enables the program to analyze the succeeding cells as will be described below.

In step 23, the cell index is examined to determine whether it is greater than or equal to 64. Initially, the cell index equals the cell number. Thus if the address of the cell includes a 1 in the sixth address bit, the cell index is greater than or equal to 64. If a 1 is included in the sixth address bit of the cell, the number 64 is subtracted from the cell index in step 24. The reason for this will be described below. The program then proceeds to step 25. It is in step 25 that the syndrome sum is examined to determine whether or not the cell is good. If it is no good, it is an indication that if the sixth address line is permanently wired to a high potential, then when the other 6 address lines are cycled the cell under test will be identified. This means that the sixth address line should not be tied to a high potential (a permanent 1). Thus if the result of the test indicated in step 25 is in the negative, a 1 is stored in partial syndrome number 1 in step 26. Partial category number 1 is thus eliminated.

On the other hand, suppose that the result of the test indicated in step 23 is in the negative, that is, the sixth address bit for the cell under test is a 0. In such a case, the program proceeds to step 27. If the syndrome sum for the cell is not a 0, it is an indication that the cell is no good. Since the sixth address bit for the cell is a 0, this means that if the sixth address line is tied to a low potential and the other 6 address lines are cycled, of the possible 64 cells which can be selected one of them is the cell identified by current cell number—a bad cell. This, in turn, requires that the sixth address line not be tied to a low potential. Consequently, in step 28 a 1 is stored in partial syndrome number 2.

After either of steps 26 or 28 is performed, or if the result of either of the tests indicated in steps 25 and 27 is in the affirmative (the cell is a good cell), the program advances to step 29. It is apparent that step 23 controls a branch operation which, if the syndrome sum for the cell is not a 0, results in the elimination of one of the 14 partial categories. On the other hand, if the cell is a good cell—the result of either of tests 25 or 27 is affirmative—no partial categories are eliminated. In any case, the program advances to analyze whether the fifth address bit necessitates the elimination of a partial category (if the partial category has not already been eliminated by a lower number cell) if the cell is bad.

The initial test to determine whether the fifth address bit is a 0 or a 1 (in order that one of partial categories 3 and 4 be eliminated if the cell is bad) simply involves a determination whether the cell index is greater than or equal to 32. It will be noted that in step 24, if the cell index (originally equal to the cell number) was greater than or equal to 64, 64 was subtracted from the cell index. On the other hand, if the cell number was not greater than or equal to 64, the cell index remained unchanged. In effect, all that is accomplished by step 24 is that the sixth address bit of the cell index (originally equal to the cell number) is changed to a 0 if it was a 1. If the fifth address bit is a 1 (a binary weight of 32), then the cell index must necessarily be greater than or equal to 32. In step 29, a determination is made as to the value of the fifth address bit.

If the cell index is greater than or equal to 32, in step 30 the number 32 is subtracted from the cell index. This is done only so that the fifth address bit for the cell index is changed from a 1 to a 0 before the program advances to step 35. Following step 30, the syndrome sum for the cell is once again examined. If it is a 0, indicating that the cell is good, the program advances directly to step 35. On the other hand, if the syndrome sum is a 1 or a 2, it is an indication that address line 5 cannot be wired to a high level because if it is and the other six address lines are cycled the cell number being analyzed will be identified—and it is a bad cell. For this reason, in step 32, a 1 is stored in partial syndrome number 3 to eliminate this category, and the program then advances to step 35. On the other hand, if the fifth address bit for the cell index (which address bit has the same value for the cell number) is a 0, if any partial category is to be eliminated, it is partial category number 4. For this reason, in step 33 if the syndrome sum for the cell is not a 0, the system advances to step 34 which controls the storing of a 1 in partial syndrome number 4.

After partial syndrome number 3 or partial syndrome number 4 is eliminated, if the cell is no good, the program proceeds to eliminate one of partial syndrome numbers 5 and 6 (also, only if the cell is no good). In step 35, a test is performed to determine whether the fourth address bit in the cell index (cell number) is a 1 or a 0. Since if one or both of the two most significant address bits are 1's, they are changed to 0's in steps 24 and 30, the cell index by the time step 35 is reached cannot possibly be greater than 31. If the fourth address bit is a 1, the cell index will be greater than or equal to 16; if the fourth address bit is a 0, the cell index will be less than 16. In either case, if the syndrome sum is not 0, the respective one of partial syndrome numbers 5 and 6 is eliminated. Steps 35–40 are similar to steps 29–34 and steps 23–28. The only differences are that in step 38 or 40 one of partial syndrome numbers 5 and 6 is eliminated, and in step 36 the fourth address bit, if it was initially a 1, is changed to a 0.

In a similar manner, the basic algorithm is performed four more times—in steps 41–46, 47–52, 53–58, and 59–63. In each group of steps, if the cell is bad one more partial category is eliminated. Also, in each group of steps, the cell index is reduced by a different binary weighted number. It should be noted that in the last series of steps (59–63) the cell index is simply tested to see if it is a 1. After steps 53–58 are performed, address bits 1 through 6 in the cell index have been changed to 0's if they were previously 1's. The cell index is then a 0 or a 1 dependent upon whether address bit 0 in the original cell number is a 0 or a 1. If it is a 1, partial category number 13 must be eliminated (in the case of a bad cell) so that program branches to the left in step 59; if the cell index is a 0, partial category number 14 must be eliminated so the program branches to the right. It should also be noted that the cell index is not reduced in a step comparable to steps 24, 30, 36, 42, 48 and 54 because the cell index is no longer required after step 59 is performed.

When any cell number is being operated upon, if the cell is a bad cell, seven of the partial syndromes are set in the 1 state. The first time that a bad cell is processed, seven of the partial syndromes are newly set in the 1 state. The second bad cell results in at least one more partial syndrome being set in the 1 state. Thereafter, a bad cell need not necessarily eliminate any additional partial categories. For example, suppose that the first two bad cells have addresses 0000001 and 0000010. If the third bad cell has an address 0000011, no new partial categories are eliminated inasmuch as the first two cells resulted in the elimination of nine partial categories, and the third bad cell results in the elimination of seven of these same categories.

In step 64, the cell number is incremented. Referring back to step 20, it will be recalled that the first cell number operated upon is cell number 0 since the cell number is initially set to 0. Thus with the incrementing of the cell number, the second cell to be operated upon is cell number 1, followed by cell number 2, etc.

After the cell number is incremented, the program performs a test to determine whether or not all cell numbers have been processed. The last cell number is cell number 127. After this cell is processed, in step 64 the cell number is incremented to 128. In step 65, the system tests whether all cell have been processed. If the cell number is not 128 the program proceeds to step 66 which is an instruction to return to step 21. In step 21 the syndrome sum for the new cell is formed, in step 22 the cell index is set equal to the new cell number, and the program then proceeds to eliminate additional partial categories if necessary.

On the other hand, if the result of the test in step 65 is in the affirmative, it is an indication that all cell numbers have been processed and inapplicable partial categories have been eliminated. The program proceeds to step 67 during which the 14 partial syndromes are examined to see whether at least one contains a 0. If none of the partial syndromes contains a 0, it is an indication that all partial categories have been eliminated. The system proceeds to step 68; the printout indicates that there are no partial categories for the chip being tested. On the other hand, if at least one partial syndrome contains a 0, the program proceeds to step 69; the partial syndrome memory locations which contain 0's are printed. These partial syndromes (e.g., numbers 2, 7 and 13) are indicative of the modes in which the chip under test can be used a partial chip.

After either of steps 68 or 69 is performed, the system proceeds to step 70—an instruction to go back to step 2 during which a new chip is set up for testing.

It should be noted that the method of my invention can be extended to allow the rapid determination of partial categories in the case where two or more address conductors are permanently wired to high or low potentials. In the event two conductors are so wired, only 32 cells in a 128-cell chip would be utilized. Since there are 21 ways in which two conductors can be selected from a total of seven, and the two conductors can be permanently wired in four possible states (00, 01, 10 and 11), there are 84 partial categories of the type in which 128-cell chips are used as 32-cell chips. When each cell number is operated upon (after the testing is finished), all possible pairs of address bits must be considered to determine which partial categories must be eliminated as a result of the cell being bad. Each bad cell thus results in the elimination of 21 partial categories (although in this case also some of the partial categories may have been eliminated previously). More steps are required to determine which partial categories are eliminated by each bad cell, but the necessary steps will be apparent to those skilled in the art. The program in such a case is predicated on the same type of observation described above. If any cell is bad, it means that no pair of address conductors can be permanently wired to potentials which would represent the respective address bits in the cell address. This, in turn, means that the respective partial category must be eliminated.

It should also be noted that the method of my invention is applicable to batch processing of the test data. It is not necessary to perform the steps of my invention during the time that a new chip is being set up, as depicted in the illustrative embodiment of the invention. Instead, a list of bad cells can be made for each chip. After the testing of a number of chips (modules, etc.) is over, all of the test data for the many chips can be operated upon at the same time to determine the partial categories for each chip.

In the illustrative embodiment of the invention, the address of every cell on the chip is operated upon. It is possible to reduce the total number of steps performed in the program (in the case of chips on which most cells are good) by performing a branch operation between steps 21 and 22: if a cell is no good steps 22–63 are executed, while if the cell is good the program skips directly to step 64. In the case of a good cell, none of the partial syndrome numbers will be set in the 1 state, and it is thus possible to skip steps 22–63. Similarly, it is possible to make a list of the addresses of just the bad cells, and to process each of these addresses in accordance with steps 23–63. In such a case, there would be no need for a cell index; the cell number itself would be processed directly and instead of incrementing the cell number (step 64) successive addresses would be taken from the initial list and operated upon.

Other modifications are also possible. For example, suppose that partial categories 3 and 4 are eliminated some time during the processing of the addresses of the bad cells. In such a case, there is no need to perform steps 31–34 for subsequent addresses. If in step 29 it is determined that the cell index is less than 32, the program can go directly to step 35; on the other hand, if the cell index is greater than or equal to 32, step 30 would be performed before an advance is made to step 35. In this way, as soon as a pair of partial categories is eliminated, the program can modify itself so that the respective bit in all subsequent addresses is not examined for the purpose of eliminating one of the two partial categories.

In general, in the case of a chip having $2^N$ memory cells identifiable by N address bits for which it is desired to determine those of the 2N partial categories which are applicable, it is necessary to examine the bit values in the addresses of a sufficient number of bad cells such that each of the possible 2N individual address bit values, if it is contained in the address of at least one bad cell, is examined at least one time. By identifying the partial memory categories associated with the address bit values thus examined, it is possible to determine the partial categories applicable to the chip (those not previously identified). Similar remarks apply to the case of partial categories in which two or more address conductors are addressed permanently.

The same basic algorithm can be carried out in another manner. In many computers there is a mask instruction which in effect performs an AND operation on a bit-by-bit basis. For example, if the word 0111000 is masked by the word 1011000 the resulting word is 0011000. Consider an initial mask of 1111111, each bit position of which is associated with a respective one of partial categories 2, 4, 6, 8, 10, 12 and 14. A 1 in the mask indicates that the respective partial category has not yet been eliminated; initially, all seven of the partial categories are available. Consider three bad cells having addresses 0111110, 1101110 and 0010110. Neglecting for the moment the partial categories eliminated by the 1's in each of these three addresses, it can be shown that a succession of mask operations eliminates all inapplicable even-number partial categories. When the address of the first bad cell (0111110) is operated upon by the initial mask (1111111), the resulting word is the same as the address of the first bad cell. In this word, there are 0's in the first and last bit positions, representing partial categories 2 and 14 and thus these categories are eliminated. This word is used as the new mask with the address of the next bad cell. When the next address (1101110) is masked by the word 0111110, the resulting word (new mask) is 0101110. It is apparent that partial category 10 has been eliminated along with partial categories 2 and 14. When the new mask is used with the address of the third bad cell (0010110), the resulting word is 0000110. This is an indication that of the seven even-number partial categories, the chip under test can be used only as a partial type 4 or 6.

It is still necessary to eliminate the inapplicable odd-number partial types. This can be accomplished with the use of the same procedure, but in this case complementing the address of each bad cell before it is processed; a 0 in each complemented address causes the respective odd-number partial category to be eliminated. Alternatively, it is possible to utilize the true address if the computer is capable of performing an OR operation on the individual bits of two words. In such a case, the initial mask would be 0000000, where a 0 represents an applicable category rather than an inapplicable category. In the example above, the address of the first cell, when OR'ed with the initial mask on a bit-by-bit basis, results in the word 0111110—indicating that partial categories 3, 5, 7, 9 and 11 have been eliminated. When this new mask is used with the address of the second bad cell, the result of the bit-by-bit OR operation is 1111110, and when this word is used in a similar fashion to process the address of the third cell, the final result of the processing is 1111110. Since there is only one position in the final word which contains a 0, there is only one applicable odd-number partial type (number 1).

This procedure is similar to that disclosed in detail above in that the individual bit values of the addresses of bad cells are used to eliminate respective partial categories.

Although the invention has been described with reference to a particular embodiment, it is to be understood that this embodiment is merely illustrative of the application of the principles of the invention. The processing steps have utility in nonmemory applications. Suppose, for example, that on a particular semiconductor chip particular logic (nonmemory) circuits can be selected for operation in accordance with bit signals on address conductors. If some of these circuits are inoperative, rather than to discard the chip it is possible to utilize my invention to determine how to use the chip but with lesser capacity, i.e., the partial operational categories of the chip. Thus it is to be understood that numerous modifications may be made in the illustrative embodiment of the invention and other arrangements may be devised without departing from the spirit and scope of the invention.

What I claim is:

1. A method for automatically determining the partial memory categories, each having (N-1) effective address bits, applicable to a memory chip having $2^N$ memory cells identifiable by N address bits comprising the steps of:

1. testing each of the cells on the chip to determine the addresses of bad cells; and
2. performing the following substeps on a digital computer:

a. examining each bit in the N-bit address of each bad cell, b. identifying one of the two partial memory categories associated with each address bit examined in substep (a) in accordance with the value of that address bit, and c. determining which of the 2N partial memory categories have not been identified after substeps (a) and (b) have been performed in connection with every bad cell.

2. A method for automatically determining partial memory categories in accordance with claim 1 wherein substep (a) includes the substeps of examining the address bits of each bad cell in sequence in decreasing order of significane and changing each examined address bit to a 0 if it was a 1, and substep (b) includes identifying a particular one of two partial memory categories for each address bit in accordance with whether the value of the cell address, prior to the changing of just the respective address bit from a 1 to a 0, is greater than or equal to the binary weight of the address bit in the overall cell address.

3. A method for automatically determining partial memory categories in accordance with claim 2 wherein a plurality of chips are tested in sequence in step (1) and step (2) is performed for each chip following the testing of that chip and prior to the testing of a succeeding chip.

4. A method for automatically determining partial memory categories in accordance with claim 1 wherein a plurality of chips are tested in sequence in step (1) and step (2) is performed for each chip following the testing of that chip and prior to the testing of a succeeding chip.

5. A method for automatically determining partial memory categories applicable to a memory chip having $2^N$ memory cells identifiable by N address bits comprising the steps of:

1. testing each of the cells on the chip to determine the addresses of bad cells; and
2. performing the following substeps on a digital computer:
   a. examining bits in the N-bit address of each bad cell,
   b. identifying the partial memory categories eliminated by the bits examined in substep (a) in accordance with the values of said address bits, and
   c. determining which of the partial memory categories have not been identified after substeps (a) and (b) have been performed in connection with every bad cell.

6. A method for automatically determining partial memory categories in accordance with claim 5 wherein a plurality of chips are tested in sequence in step (1) and step (2) is performed for each chip following the testing of that chip and prior to the testing of a succeeding chip.

7. A method for automatically determining the partial memory categories, each having (N-1) effective address bits, applicable to a memory chip having $2^N$ memory cells identifiable by N address bits comprising the steps of:

1. testing each of the cells on the chip to determine the addresses of bad cells; and
2. performing the following substeps on a digital computer:
   a. examining the bit values in the addresses of a sufficient number of bad cells such that each of the possible 2N individual address bit values, if it is contained in the address of at least one bad cell, is examined at least one time,
   b. identifying the partial memory categories associated with the address bit values examined in substep (a), and
   c. determining which of the 2N partial memory categories have not been identified after substeps (a) and (b) have been performed.

8. A method for automatically determining partial memory categories in accordance with claim 7 wherein a plurality of chips are tested in sequence in step (1) and step (2) is performed for each chip following the testing of that chip and prior to the testing of a succeeding chip.

9. A method for automatically determining partial memory categories applicable to a memory chip having $2^N$ memory cells identifiable by N address bits comprising the steps of:

1. testing each of the cells on the chip to determine the addresses of addresses of bad cells; and
2. following step (1) performing the following substeps on a digital computer:
   a. identifying the partial memory categories which must be eliminated in accordance with the values of the bits in the addresses of all bad cells, and
   b. determining which of the partial memory categories have not been identified in substep (a).

10. A method for automatically determining partial memory categories in accordance with claim 9 wherein a plurality of chips are tested in sequence in step (1) and step (2) is performed for each chip following the testing of that chip and prior to the testing of a succeeding chip.

11. A method for automatically determining partial operational categories applicable to a semiconductor chip having $2^N$ logic circuits identifiable by N address bits comprising the steps of:

1. testing each of the logic circuits on the chip to determine the addresses of bad logic circuits; and
2. following step (1) performing the following substeps on a digital computer:
   a. identifying the partial operational categories which must be eliminated in accordance with the values of the bits in the addresses of all bad logic circuits, and
   b. determining which of the partial operational categories have not been identified in substep (a).

12. A method for automatically determining partial operational categories in accordance with claim 11 wherein a plurality of chips are tested in sequence in step (1) and step (2) is performed for each chip following the testing of that chip and prior to the testing of a succeeding chip.

13. A method for automatically determining partial operational categories applicable to a semiconductor chip having a plurality of operative circuits and a plurality of inoperative circuits comprising the steps of:

1. testing each of said circuits to identify the inoperative circuits; and
2. supplying the identities of the inoperative circuits to a digital computer and operating said digital computer to identify the partial chip operational categories containing functional circuits.

14. A method for automatically determining partial operational categories in accordance with claim 13 wherein step (1) is performed in its entirety prior to the performance of step (2).

15. A method for automatically determining partial memory categories applicable to a semiconductor memory chip having a plurality of operative cells and a plurality of inoperative cells comprising the steps of:

1. testing each of said cells to identify the inoperative cells; and
2. supplying the identities of the inoperative cells to a digital computer and operating said digital computer to identify the partial memory categories containing functional cells.

16. A method for automatically determining partial memory categories in accordance with claim 15 wherein step (1) is performed in its entirety prior to the performance of step (2).

17. A method for automatically determining partial operational categories applicable to a tested semiconductor chip having a plurality of operative circuits and at least one inoperative circuit comprising the step of:

supplying the identity of the at least one inoperative circuit to a digital computer and operating said digital computer to identify the partial chip operational categories containing functional circuits.

18. A method for automatically determining partial memory categories applicable to a tested semiconductor memory chip having a plurality of operative cells and a plurality of inoperative cells comprising the step of:

supplying the identities of the inoperative circuits to a digital computer and operating said digital computer to identify the partial memory categories containing functional cells.

19. A method for selecting and using a semiconductor chip by automatically determining its partial operational categories comprising the steps of:

1. testing the chip to determine the identities of its operative circuits and the identities of it inoperative circuits,
2. supplying the identities of the inoperative circuits to a digital computer and operating said digital computer to identify the partial chip operational categories containing functional circuits, and
3. selecting at least one partial chip operational category mode in which said chip is used from the partial chip operational categories identified in step (2).

* * * * *